HERBERT U. RAGLE JR. &
IRVING STEIN
INVENTORS

BY Nathan N. Kallman

ATTORNEY

HERBERT U. RAGLE JR. &
IRVING STEIN
INVENTORS

BY Nathan N. Kallman
ATTORNEY

HERBERT U. RAGLE JR. &
IRVING STEIN
INVENTORS
BY Nathan N. Kallman
ATTORNEY

United States Patent Office 3,251,046

Patented May 10, 1966

3,251,046

SIMULTANEOUS WRITE-READ TRANSDUCER ASSEMBLY HAVING BOTH STATIC AND DYNAMIC READBACK

Herbert U. Ragle, Jr., San Jose, and Irving Stein, Palo Alto, Calif., assignors to Ampex Corporation, Redwood City, Calif., a corporation of California Filed Nov. 24, 1961, Ser. No. 154,716
7 Claims. (Cl. 340—174.1)

This invention relates to magnetic recording and reproducing, and in particular to magnetic transducing assemblies that afford substantially simultaneous recording and reproduction of an information signal.

In many applications of magnetic tape apparatus, such as utilized with computers and instrumentation devices, it is desirable to determine immediately after recording whether an information signal is being correctly recorded, if at all. If the recording operation is erratic or if defective tape causes dropouts, there may be an extensive loss of signal information that would not be recoverable or available again.

In presently known recording systems, while an information signal is being recorded on a storage medium or magnetic tape, it is generally necessary to wait for the medium or tape to be moved a substantial distance from the recording area or transducing gap before playback may be achieved. However, it would be advantageous to be able to record an information signal and to reproduce such information signal substantially simultaneously with the recording so that immediate detection, verification and control is possible.

Various schemes have been proposed for providing simultaneous recording and playback with magnetic transducing assemblies. However, in presently known combinations, separate nonmagnetic gaps are employed for the record and playback processes respectively. Since such gaps must be spaced physically, an appreciable time difference exists between the occurrence of the recording of the information signal and playback of the recorded signal. During this period of time, substantial information may be lost without the knowledge of the operator.

An object of this invention is to provide an improved magnetic transducing assembly that enables recording of a signal and substantially instantaneous playback of the recorded signal.

Another object of this invention is to provide a magnetic transducing assembly that employs a single magnetic core having a single nonmagnetic gap for practically simultaneous record and playback operation.

Another object is to provide an improved magnetic transducing assembly that provides better resolution for pulse signal playback.

Another object is to provide an improved magnetic tape dropout sensing system that comprises a single core having a single gap.

According to this invention, a magnetic transducing system that affords simultaneous recording and playback comprises a single magnetic core having a single nonmagnetic gap and a sensing system coupled to the inductive circuit associated with the core. An input signal is applied to the core through the inductive circuit for varying the magnetic flux in the core, and for recording signal information on a magnetic medium or tape disposed adjacent to the gap, in a well known manner. The signal information may be in the form of sine waves, RZ (Return-to-Zero) pulse signals, or NRZ (Non-Return-to-Zero) pulse signals, for example.

After recording any of these signals, an output signal that has a static component may be instantaneously derived from the recorded medium or tape by means of the sensing system coupled to the core. The static component represents the variation in reluctance adjacent to the gap, such as may be provided by the presence of a magnetic medium or tape. Changes in the magnetic characteristic of the medium may also be detected as a static readout. A dynamic readout component that represents the rate of change of magnetic flux developed from the varying signal as the recorded medium traverses the gap area may also be obtained, such as is derived with conventional transducing assemblies.

In one embodiment of the invention, the sensing system coupled to the core comprises a balanced bridge circuit that serves to negate or "buck out" such component of the input signal that appears in the core and would tend to pass directly to the output circuit. Thus the balanced bridge circuit ensures that only the recorded signal derived from the medium is read out by means of the output circuit.

In another embodiment wherein RZ pulses may be recorded and reproduced instantaneously, a threshold circuit serves to sense the static component of the recorded signal. In an embodiment for processing NRZ pulses, a circuit comprising balanced Hall elements is employed for instantaneous playback of the recorded signal.

In a specific embodiment of the invention, a pulse coding system and method is utilized for NRZ pulse recording and instantaneous readout. Unipolar RZ pulses having a greater frequency than the NRZ signal frequency are superimposed on the NRZ pulses. In the event of tape dropout, the RZ pulses provide immediate detection to avoid loss of extensive NRZ information.

The invention will be described in greater detail with reference to the drawing in which:

FIGURE 1 is a schematic diagram of a magnetic transducing system, according to the invention, that employs a balanced bridge circuit;

FIGURES 2*a–e* are a series of graphs depicting the magnetization of a magnetic medium by Return-to-Zero (RZ) pulse signal recording;

FIGURES 3*a–e* are a series of graphs depicting the magnetization of a magnetic medium by Non-Return-to-Zero (NRZ) pulse signal recording;

Figure 1:
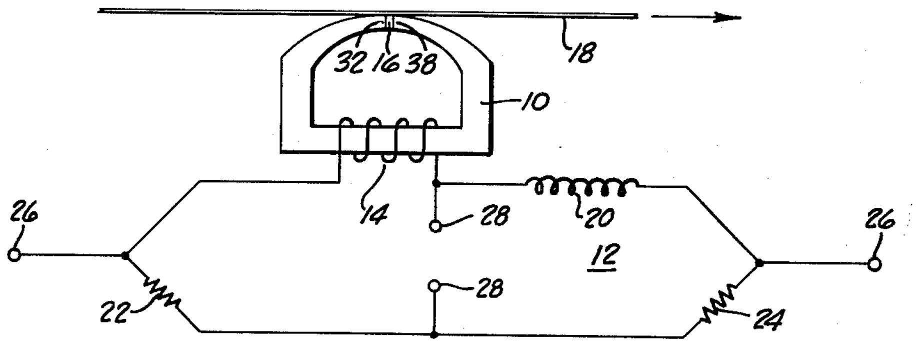

In FIGURE 1, an embodiment of the invention comprises a magnetic transducing system having a magnetic core 10 coupled to a balanced bridge circuit 12 by a coil 14 wound around the core 10. The core 10 has a single nonmagnetic gap 16 across which a magnetic medium or tape 18 passes during the simultaneous recording and reproducing process.

The balanced bridge circuit 12, shown here in one form by way of example, includes the coil 14 and has an inductive element 20 connected in series with the coil 14. The balanced circuit 12 also may include a pair of series connected resistances 22 and 24 that are coupled to the coil 14 and the inductive element 20 in a balanced configuration. The coil 14 and the resistance 22 forming a first leg of the bridge 12 preferably have an inductive and resistive value equivalent to that of the second leg comprising element 20 and the resistance 24. An input signal to be recorded and simultaneously reproduced may be applied across a pair of input terminals 26 coupled to the bridge circuit 12. An output signal may be derived from a pair of output terminals 28 connected between the first and second legs of the bridge circuit 12. The input signal applying means and the output signal deriving means are interconnected in a common balanced circuit. Thus, the magnetic flux developed in the magnetic core 10 by an input signal is effectively negated or bucked out by the balanced circuit 12, and only such signal information that has been actually recorded on the magnetic medium or tape 18 disposed adjacent to the gap 16 may be reproduced.

Figure 2:
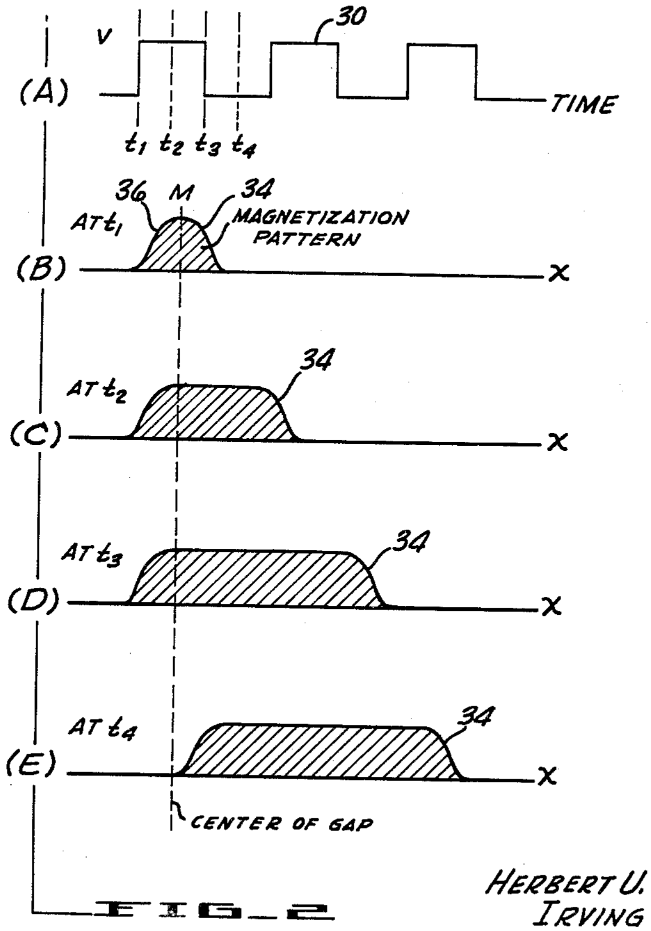

In operation, if an RZ signal 30 such as shown in FIGURE 2*a* is applied to the input terminals 26, a magnetization pattern will be recorded on the tape area adjacent to the gap 16, such as shown in FIGURE 2*b* at the instant $t_1$. An RZ system may be defined as one wherein the input pulse signal is returned to zero, and maintained at such zero value for a finite interval during which no magnetization of the tape occurs. It is noted that the magnitude of magnetization, when an RZ input signal is present, is at a maximum at the center portion of the gap, and falls off as the distance X from the gap center increases. The recording of the negative going portion of the RZ pulse occurs at the leading pole 32 of the gap.

As the tape 18 progresses, with the RZ pulse 30 at its maximum amplitude as at $t_2$, the magnetization pattern appears as shown in FIGURE 2*c*. At $t_3$ and after the tape 18 has moved an appreciable distance X, when the RZ pulse 30 falls to zero the magnetization pattern is as illustrated in FIGURE 2*d*, with portions still located on either side of the gap center. However, when the RZ input signal remains at zero for a finite interval such as between $t_3$ and $t_4$, there is no magnetizing field applied to the tape 18 through the gap 16. During such interval, no new magnetization of the tape 18 takes place and the previously recorded magnetization pattern moves past the gap center, as represented by FIGURE 2*e*.

The RZ recorded signal that appears on the tape 18 in the form of a magnetization pattern may be reproduced by means of a combination of static readout and dynamic readout. Static readout may be achieved although there is no tape motion, which is necessary for dynamic readout. Thus, when there is no magnetic tape or other magnetic material adjacent to the gap 16, the balanced bridge circuit 12 will provide a zero or other predetermined output voltage. However, in the presence of the tape 18 which has a permeability greater than unity, the reluctance of the magnetic circuit is lowered, the bridge circuit 12 becomes unbalanced, and an additional output voltage will appear at the output terminals 28. Therefore, this output voltage provides a static readout without tape motion. It is seen that the static readout is a function of the magnetic head-tape circuit reluctance, particularly the reluctance of the magnetic tape adjacent to the nonmagnetic gap.

With static readout, the magnetic materials of both the core 10 and the medium 18 follow the virgin magnetization curve for every half cycle of the input square wave. The saturation field ratio of the core and tape materials is approximately 100:1 with the tape saturating at a lower value.

The dynamic readout signal is obtained by traversal of the recorded tape past the gap 16 such that the lines of flux vary, and the rate of change of such flux lines develop variations in the output signal. Thus, whenever a slope of the magnetization pattern, such as the leading slope 34 or trailing slope 36 passes by the gap region, the magnetic flux field adjacent to the gap 16 and the trailing pole 38 of the core 10 is varied such that an output signal corresponding to such flux changes is derived.

Figure 3:
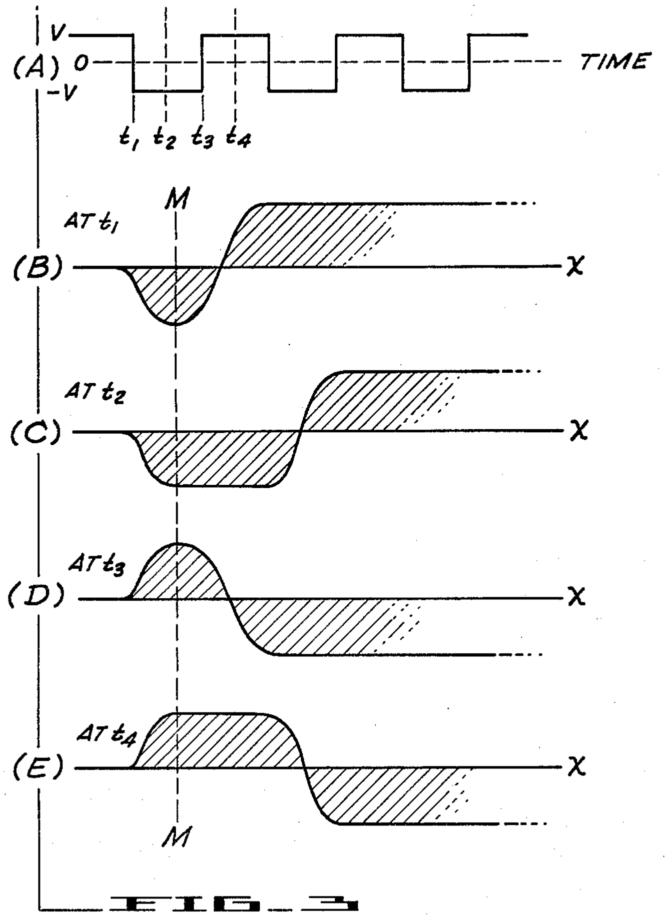

Similarly an NRZ (Non-Return-to-Zero) pulse signal, such as shown in FIGURE 3*a*, may be recorded and reproduced simultaneously. When an NRZ signal is applied to the input terminals 26 the magnetization patterns that are developed during the interval $t_1$–$t_4$ are shown in FIGURES 3*b–e* respectively. In NRZ recording, the presence or absence of the pulses, and their polarity when present, represent the information that has been recorded.

During NRZ recording, after the pulse transition from +V to −V at time $t_1$, the tape magnetization pattern appears as illustrated in FIGURE 3*b*. At $t_2$, the magnetization pattern will be as shown in FIGURE 3*c* as a result of the tape motion. At $t_3$, the reversal of the NRZ pulse, as represented in FIGURE 3*a*, causes the magnetization pattern to be the reverse of the pattern established at $t_1$. Then at $t_4$, as the tape is moved, a resultant magnetization pattern appears as shown in FIGURE 3*e*.

Instantaneously after the recording process, the presence of the recorded tape 18 adjacent to the gap causes a noticeable flux change in the area of the gap 16 and at the trailing pole of the core 10. An electrical current will be induced in the coil 14 reflecting the flux variations, and the resultant current will provide an output signal through the bridge circuit 12 to the output terminals 28.

Figure 4:
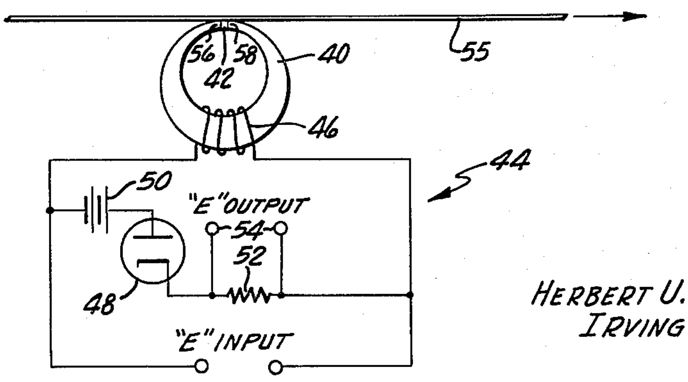
FIGURE 4 is a schematic diagram of another embodiment of the transducing system of this invention, employing a threshold sensing circuit.

In FIGURE 4, another embodiment of the invention comprises a magnetic core 40 having a single nonmagnetic gap 42. A threshold sensing circuit 44 is coupled to the core 40 by means of an inductive coil 46. The sensing circuit 44 includes a diode 48 that has its anode connected to a power supply or battery 50, and its cathode coupled to a load resistor 52, across which an output signal may be derived by means of output terminals 54. The series combination of the diode 48, battery 50, and resistor 52 is shunted across the inductive coil 46 that is coupled to the core. Means for providing an input signal are also coupled to the inductive winding 46.

When there is no tape present adjacent to the nonmagnetic gap 42, the magnetic circuit associated with the core 40 has a constant inductance. The battery 50 provides a threshold voltage at which the diode 48 is nonconducting and thus no electrical current flows through the coil 46. When a magnetic tape 55 is introduced adjacent to the gap 42, the inductance of the head-tape circuit is increased. The increased inductance causes a higher voltage to be applied to the anode of the diode 48 thus rendering the diode conducting. The diode current, which is a function of the voltage applied to the diode anode, provides an output voltage representative of the magnitude of the magnetic field applied at the gap 42. A static readout is thereby available when a magnetic field, such as may be provided by the presence of a magnetic tape, is disposed adjacent to the gap.

This threshold circuit configuration may be employed to detect whether a tape is recording, and in particular is applicable for RZ recording and instantaneous playback. When an RZ pulse is applied to the input terminals and recorded on a moving tape 55, the recording of the pulse occurs at the leading pole 56 adjacent to the magnetic tape. As the tape 55 progresses and traverses the center area of the nonmagnetic gap 42, the recorded positive going edge of the RZ pulse is sensed by the trailing pole 58 of the core 40 and provides an output voltage through the magnetic circuit to the ouput terminals 54. This output signal does not depend upon tape motion or the rate of change of flux, but represents the occurrence of the positive going portions of the RZ pulses. It is understood that if a diode and battery were connected in opposing polarity to that of diode 48 and battery 50 across the core 46, the negative going portions of the RZ pulse signal could be detected.

Figures 5, 6, 7:
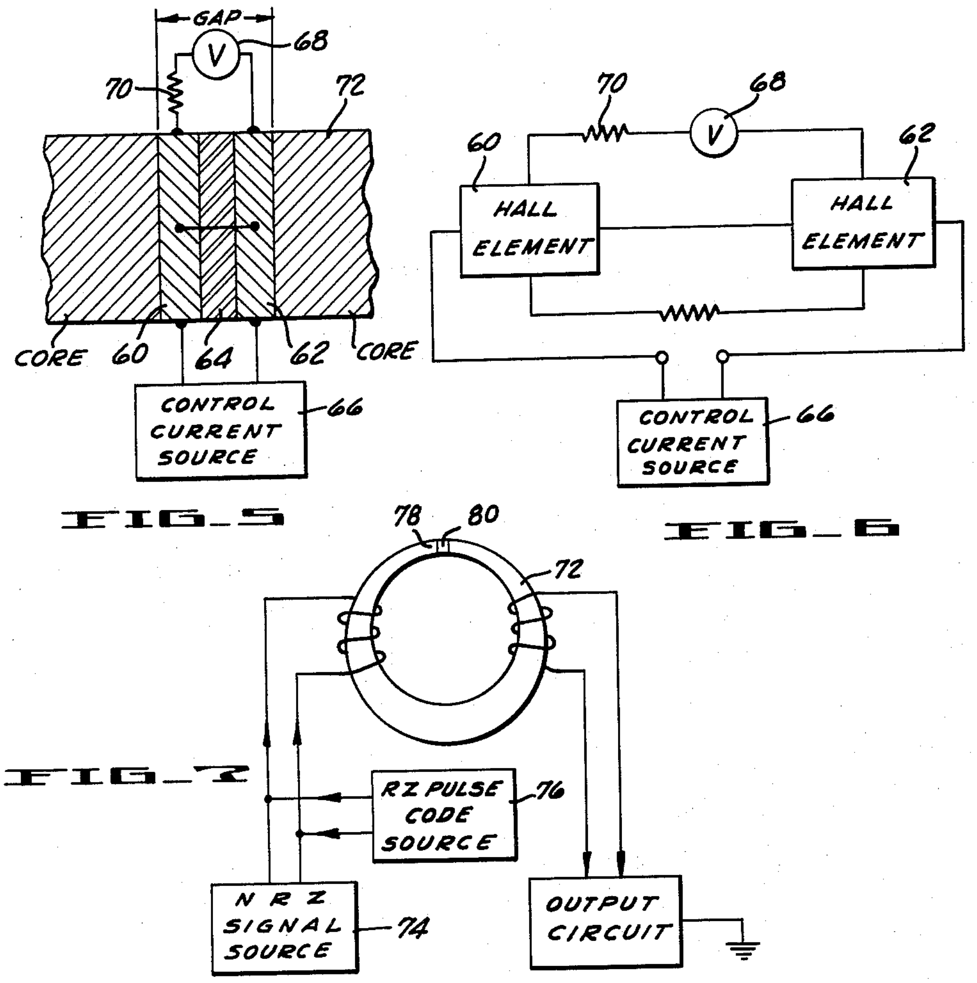
FIGURE 5 is a fragmentary plan view of a magnetic core with a balanced Hall element sensing circuit.
FIGURE 6 is a schematic and block diagram of the balanced Hall element circuit of FIGURE 5.
FIGURE 7 represents a magnetic transducer assembly utilized with a pulse coding system, in accordance with this invention.

In FIGURES 5 and 6, a balanced sensing circuit for connection to a single gap magnetic core assembly may comprise a pair of similar Hall elements 60 and 62. The elements 60 and 62 are positioned within the single gap of a magnetic core (shown in segment) and spaced by an electrical insulator 64. A control current is supplied from a source 66 to the elements 60 and 62, and a voltmeter 68 and resistance 70 may be connected in series with the elements 60 and 62 to sense an output voltage.

This configuration is particularly applicable to NRZ recording where the recording takes place past the center portion of the gap. Thus when NRZ signal has been recorded on a magnetic tape (not shown), as the tape moves towards the trailing pole 72 of the gap, the recorded magnetization pattern (as in FIGURE 3*c*, for example) presents a greater flux intensity to the second element 62. The sensing circuit therefore becomes unbalanced, and an output voltage will appear on the voltmeter 68. In the absence of an input signal to the magnetic core, the Hall elements will be in a balanced state and a zero or other predetermined output voltage will be recorded.

Figure 8:
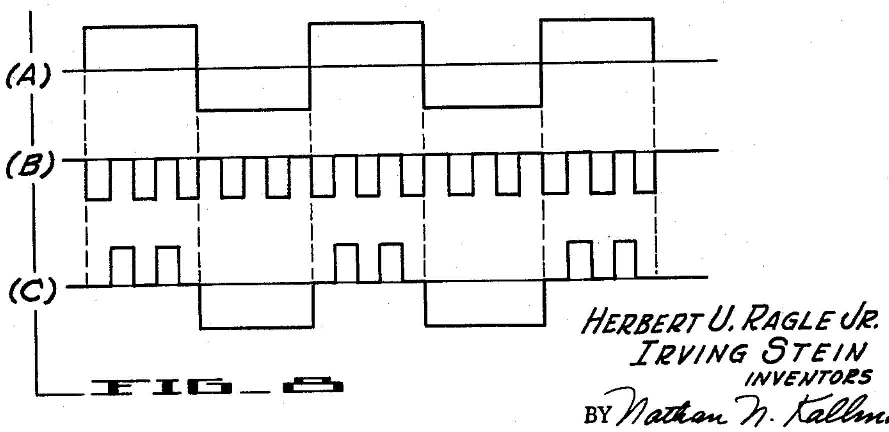
FIGURES 8*a–c* are a series of representations of the signals utilized in an NRZ pulse recording system with RZ pulse coding.

In another embodiment of the invention particularly applicable for NRZ pulse recording, a magnetic recording and reproducing system such as shown in FIGURE 7 employs a pulse coding means for instantaneously detecting the recorded signal, or tape dropout and the failure to record. As illustrated, a magnetic source 72 receives NRZ pulse signals (FIGURE 8*a*) from a source 74 simultaneously with RZ code pulse signals (FIGURE 8*b*) derived from a source 76.

The RZ pulse signal comprises a high frequency square wave having a wavelength approximately equal to or less than the width of the gap. The negative RZ signal, which is of the same amplitude as the NRZ pulse signal but of reverse polarity, periodically cancels the positive portions of the NRZ input signal, and is also added to the negative NRZ input signal. However, since the NRZ input pulse saturates the tape, the addition of like polarity RZ pulses will not affect the recorded negative NRZ signal portions.

Since the resultant positive RZ pulses are recorded at the leading pole 78 of the core 72 and may be detected instantaneously after the recorded pulse has passed the center of the gap 80, the presence of the RZ output signal for every half cycle of the NRZ output signal indicates that the tape is recording effectively, and that there is no undesirable dropout. In the event that the tape is spaced from the gap 80 or if the tape oxide coating is defective such that signal dropout occurs, the RZ pulse code signals would decrease in amplitude or disappear. This would provide immediate detection of faulty recording so that the tape apparatus may be halted before any appreciable loss of information occurs.

In this manner, the recorded negative portions of the NRZ signal may be effectively recorded and read out as an intelligence signal related to the input information signal. In addition, after the recording and readout operation, the recorded tape only carries the NRZ information pulses since the RZ pulses have been effectively erased after playback. It is noted that the coding system concept may be employed for any type of alternating waveform, including sine waves, with coding pulses having a proper relationship to the information signal being recorded. By use of the coding system, it is not necessary to provide a balanced sensing system such as described heretofore.

There has been described herein a novel transducing system that employs a signal magnetic core having a single nonmagnetic gap, coupled with a sensing means for providing an output signal substantially simultaneously with the recording of an information signal. It is understood that the scope of the invention is not limited to the configurations set forth herein but may encompass various sensing systems and circuits for simultaneously recording and reproducing waveform signals with a single gap magnetic transducer.

What is claimed is:

1. A magnetic transducing system responsive to both static and dynamic readout effects for simultaneous and continuous recording and playback of a magnetic signal in a storage medium during a single pass thereof comprising:

a magnetic core having a single recording gap;

means for repeatedly applying an input signal to said magnetic core;

said storage medium adapted to be disposed in magnetic field bridging relation to said recording gap for selectively transferring and storing said repeatedly applied input signal in said medium;

a sensing circuit coupled to said magnetic core and adapted to simultaneously sense during said single pass a change in the magnetization recorded in the storage medium when same is in the presence of the gap as well as a change of the core gap reluctance in the absence of the medium for continuously deriving an output signal to verify the transfer of the series of input signals to said medium;

said sensing circuit being in a state of balance in the absence of the storage medium from the gap such that only upon transfer of each input signal to said medium in the presence of the gap is said output signal simultaneously generated to continuously verify the transfers.

2. A system for continuously verifying in a single pass the transfer of an input signal to a magnetic storage medium in response to both static and dynamic readout effects and including a recording head having a single recording gap disposed in magnetic bridging relation with the storage medium, and having a coil coupled to the head the system comprising:

sensing means adapted to simultaneously sense during said single pass a change in the magnetization recorded in the storage medium when same is in the presence of the gap as well as a change of the core gap reluctance in the absence of the medium and having an input and an output and connected at its input to the coil;

means included within the sensing means for electrically balancing the sensing means in the absence of the storage medium from its magnetic bridging relation with the recording gap to provide a zero reading at said sensing means output;

means for applying the input signal to said coil when the storage medium is in the magnetic bridging relation with the gap to transfer and store via the gap the input signal in the storage medium;

said gap and coil adapted to introduce from the storage medium to the sensing means input a continuous verify signal indicating the storage of the input signal in the storage medium prior to the signal passing beyond the recording gap;

said sensing means electrically unbalancing upon receipt of the continuous verify signal to provide a continuous output signal at the output thereof verifying the successful transfer of the input signal to the storage medium.

3. The magnetic transducing system of claim 1 wherein said sensing circuit further comprises a threshold voltage output circuit electrically coupled to said magnetic core for deriving the output signal.

4. The magnetic transducing system of claim 3 wherein said threshold voltage output circuit further comprises a diode and a power supply electrically coupled to the magnetic core.

5. The magnetic transducing system of claim 1 further comprising: a balanced Hall element configuration including two Hall elements disposed in magnetic relation within said single gap, said elements being magnetically and electrically insulated from each other; means for applying a control current to each of said Hall elements; and said sensing circuit further comprising a utilization circuit coupled to said elements for deriving said output voltage responsive to a difference in the magnetic fields applied to such elements by the medium.

6. The magnetic transducing system of claim 1 for simultaneous recording and playback of NRZ signal information wherein said sensing circuit further comprises: means coupled to said magnetic core for applying an NRZ pulse signal thereto; means coupled to said magnetic core for applying an RZ pulse code signal thereto simultaneously with the NRZ pulse signal; and a utilization circuit coupled to said magnetic core for deriving the output signal.

7. The magnetic transducing system of claim 6 wherein the frequency of the RZ pulse code signal is substantially greater than the frequency of the NRZ pulse signal, the RZ pulse code signal having a wavelength within the range of the width of the gap to less than the width of the gap.

References Cited by the Examiner

UNITED STATES PATENTS

| | | | |
|---|---|---|---|
| 2,789,026 | 4/1957 | Nordyke | 346—74 |
| 2,870,266 | 1/1959 | Westmijze | 179—100.2 |
| 2,975,407 | 3/1961 | O'Brien | 340—174.1 |
| 3,056,950 | 10/1962 | Birmingham et al. | 340—174.1 |

BERNARD KONICK, *Primary Examiner.*

IRVING L. SRAGOW, *Examiner.*

R. M. JENNINGS, A. I. NEUSTADT, *Assistant Examiners.*